United States Patent [19]

Herbinet

[11] Patent Number: 5,730,252
[45] Date of Patent: Mar. 24, 1998

[54] ORDER PREPARATION METHOD, AN ORDER PICKING CART AND ORDER PREPARATION SYSTEM

[75] Inventor: François Herbinet, Eaubonne, France

[73] Assignee: L'Oreal, Paris, France

[21] Appl. No.: 607,665

[22] Filed: Feb. 27, 1996

[30] Foreign Application Priority Data

Feb. 27, 1995 [FR] France .................. 95 02232

[51] Int. Cl.⁶ .......................... A47F 10/02; G01G 19/08
[52] U.S. Cl. ...................... 186/52; 235/383; 414/21; 414/529
[58] Field of Search ................... 186/55, 56, 61, 186/52; 235/383; 414/21, 278, 529

[56] References Cited

U.S. PATENT DOCUMENTS

| | | | |
|---|---|---|---|
| 3,836,755 | 9/1974 | Ehrat | 186/61 X |
| 3,908,800 | 9/1975 | Drapeau | 186/56 |
| 4,866,255 | 9/1989 | Sing | 235/385 |
| 5,250,789 | 10/1993 | Johnsen | 235/383 |
| 5,409,342 | 4/1995 | Galli | 414/21 |
| 5,525,025 | 6/1996 | Ootmar Ten Cate et al. | 414/529 |

FOREIGN PATENT DOCUMENTS

| | | |
|---|---|---|
| 0 494 014 A1 | 7/1992 | European Pat. Off. . |
| 494 014 | 7/1992 | European Pat. Off. . |
| 36 29 293 | 3/1988 | Germany . |
| 86 25 530 | 10/1989 | Germany . |

*Primary Examiner*—F. J. Bartuska
*Attorney, Agent, or Firm*—Oliff & Berridge, PLC

[57] ABSTRACT

An order preparation method includes assembling, in a receptacle placed on an autonomous cart, articles listed in an order from a customer and stored in a warehouse. The unit weight of each article in stock is associated with an identification of this article and the receptacle is weighed after each article is deposited and the total weight of the articles deposited is deduced. This total weight is compared with a theoretical weight equal to the unit weight of the article to be picked multiplied by the corresponding quantity of articles, and a warning signal is emitted in the event that the total weight of the articles deposited is different, plus or minus a tolerance error, from the theoretical weight calculated.

5 Claims, 4 Drawing Sheets

FIG_1

ORDER PREPARATION METHOD, AN ORDER PICKING CART AND ORDER PREPARATION SYSTEM

FIELD OF THE INVENTION

The present invention relates to an order preparation method, a picking cart for working this method, and an order preparation system using at least one such picking cart.

BACKGROUND

Numerous industrial fields, particularly pharmaceuticals, cosmetics, or large-scale distribution, are confronted with the order preparation problem.

Order preparation is an operation consisting of assembling products or articles of different kinds in one package to send them to a customer who may be an end consumer or a retailer.

The main difficulty in this operation comes from the fact that orders differ from one customer to the next.

This order diversity makes order preparation difficult to automate, especially since the products to be assembled are often very different in size, shape, and weight.

Order preparation systems such as that described in U.S. Pat. No. 3,908,800 have already been proposed.

This system uses individual independent carts each of which has a plurality of compartments containing cartons to be filled.

One order is associated with each compartment in the cart, and the system allows several orders to be prepared simultaneously on one cart.

Each cart can travel freely in a warehouse in which all the available articles are stored, moved by an operator whose job it is to pick up the articles and deposit them in the appropriate compartment in the cart.

An electronic device is carried on each cart and informs the operator of the optimal route to be followed for the orders to be prepared and, for each article storage location, the identification and number of articles to be removed as well as the carton in which these articles are to be placed.

This known system has the advantage of allowing rapid, simultaneous preparation of several orders, these orders being controlled automatically by the electronic device on board the cart.

However, in this system, no means of controlling the operations carried out by the operator is provided.

In particular, the operator is not compelled to obey the instructions given to him by the electronic device and may commit errors both when picking an article and when placing it in a compartment in the cart.

It is only at the end of the picking trip, when all the orders are prepared, that the contents of the compartments are checked.

Such checking is laborious and time-consuming.

In addition, if errors are found to have been made in the preparation of certain orders, correcting these errors may cause considerable additional work.

In addition, German Utility Model 86 25530 teaches an order preparation system using carts following a preset route along a rail.

Each cart has carton reception areas and weighing devices which, when picking is complete, check that the total weight of the filled carton corresponds to the sum of the weights of the empty carton and the articles listed in the order.

This device lacks flexibility since each cart must follow the same path through the warehouse, regardless of the locations of the articles to be picked.

Moreover, although order checking is facilitated by weighing the cartons, this check is done only at the end of the job, as with the system described in U.S. Pat. No. 3,908,800 referred to above.

Moreover, such a check does not guarantee the absence of picking errors canceling each other out and thus going unobserved since only the final weight of the carton is checked and not the individual weights of the articles picked.

The goal of the present invention is to propose an order preparation method which in particular solves the problems referred to above.

SUMMARY OF THE INVENTION

The present invention relates to an order preparation method consisting of assembling, in a receptacle placed on an autonomous cart, articles listed in an order from a customer and stored in a warehouse, comprising the following steps:

a) from the order, creating a list of articles to be picked indicating the identification of each article and number of articles, b) arranging the articles in the list according to their location in the warehouse, starting with the first article on the list so arranged, c) moving the cart in the warehouse to a point near the storage location of the article to be picked, d) picking the proper number of the article(s) ordered, e) depositing the article or articles picked in the receptacle, and f) iterating, starting from step c), through step e) for the next article in the order of the arranged list, until the list is complete.

This method also provides that the unit weight of each article in stock is associated with its identification and that, between steps e) and f) an extra step is taken consisting of weighing the receptacle, deducing the total weight of the articles deposited in step e), comparing this total weight with a theoretical weight equal to the unit weight of the article to be picked multiplied by the corresponding number of articles, and delivering a warning signal if the total weight of the articles deposited is different, plus or minus a tolerance value, from the calculated theoretical weight.

The present invention also relates to a picking cart for working the order preparation method described above.

This cart is characterized by being autonomous and having:

a surface provided with receptacle-receiving areas, at least some of said areas constituting the pan of a weighing device, an electronic device provided with a display unit, able to record a list of articles and sequentially display the identification, number, and destination receptacle of each article on the list, a memory associated with each weighing device for recording a value indicated by this weighing device at a given point in time, means for calculating the difference between a value indicated by a weighing device and the value recorded in the corresponding memory, a comparator to compare this difference with a predetermined theoretical weight, and a warning device to emit a warning signal in the event that the value is different, plus or minus a tolerance error, from the predetermined theoretical value.

The present invention also relates to an order preparation system characterized by having at least one cart as described above as well as a list preparation device including means for:

by merging several orders, creating a list of articles indicating the identification, number, and destination receptacle of each article, arranging the articles in this list according to the locations of the articles in the warehouse, and transmitting the list so prepared to the cart.

DESCRIPTION OF PREFERRED EMBODIMENTS

It will be understood that the method according to the invention allows preparation of each order controlled by the cart to be checked in real time.

This is because depositing of each article or each set of several identical articles in a receptacle on the cart is routinely followed by a check of the weight of the articles thus deposited and a comparison between this weight and the theoretical weight of the articles which, according to the order being prepared, should have been deposited in the receptacle.

Hence, any risk of several picking errors canceling each other out is removed.

In addition, because of the invention, checking is not postponed until picking is complete, so that any errors can be corrected immediately.

This minimizes the cost and consequences of correcting picking errors.

In one embodiment of the invention, each article is identified when picked by reading an identifier, for example a bar code.

The identifier may be on the package of the article or on a label placed at its storage location.

The usefulness of such identification is to reduce still further the risk of one product being mistaken for another with exactly the same weight, while weighing the products still provides a check that the proper number of articles has been deposited in the receptacle.

In addition, once all the articles in one order have been identified and recorded individually, the history of a product delivered to a customer can be retraced so that distribution quality and followup can be improved.

In one preferred embodiment of the invention, several orders are prepared simultaneously as follows.

A different receptacle is associated with each order, all the receptacles being located on the same autonomous cart, and, in step a) described above, all the orders are merged to produce a list of articles indicating the identification, number, and destination receptacle of each article and, in step e) above, the article or articles picked is or are deposited in the corresponding receptacle.

In one preferred embodiment of the invention, the order preparation system also has means for calculating theoretical weights in order to calculate, for each article to be picked, the unit weight of the article multiplied by the corresponding number for this article and associating this theoretical weight with each article on the list of articles to be picked.

For better understanding of the invention, one embodiment will now be described as a nonlimiting example with reference to the attached drawings.

Figure 1:
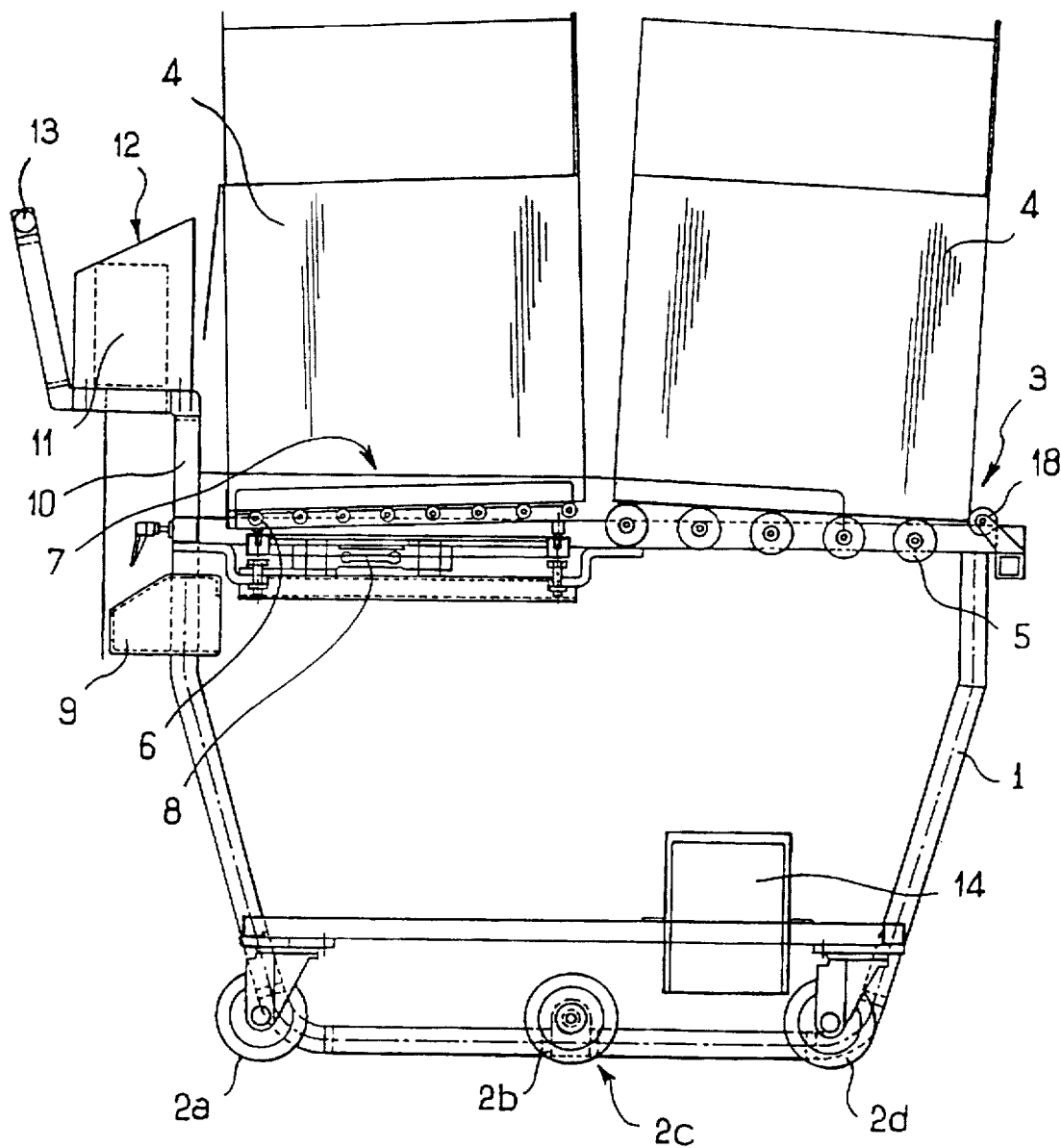
FIG. 1 is a view of an autonomous cart for working the invention seen in elevation.

The cart shown in FIG. 1 has a body 1 mounted on four wheels 2a to 2d.

The latter are arranged in the shape of a diamond to facilitate maneuvering of the cart, the central wheels 2b, 2c being fixed while front wheel 2d and rear wheel 2a are pivotable.

The upper part of body 1 defines a surface 3 provided with reception areas for receptacles 4 which in this case are cartons.

This surface 3 is provided with rollers 5 and 6 whose function is to facilitate the forward and backward movement of cartons 4.

In the example shown, surface 3 is able to receive six cartons 4 arranged in two rows of three cartons each.

Three reception areas, located at the rear of the cart, each constitute the pan 7 of a weighing device 8 connected to an electronic device 9.

Figure 2:
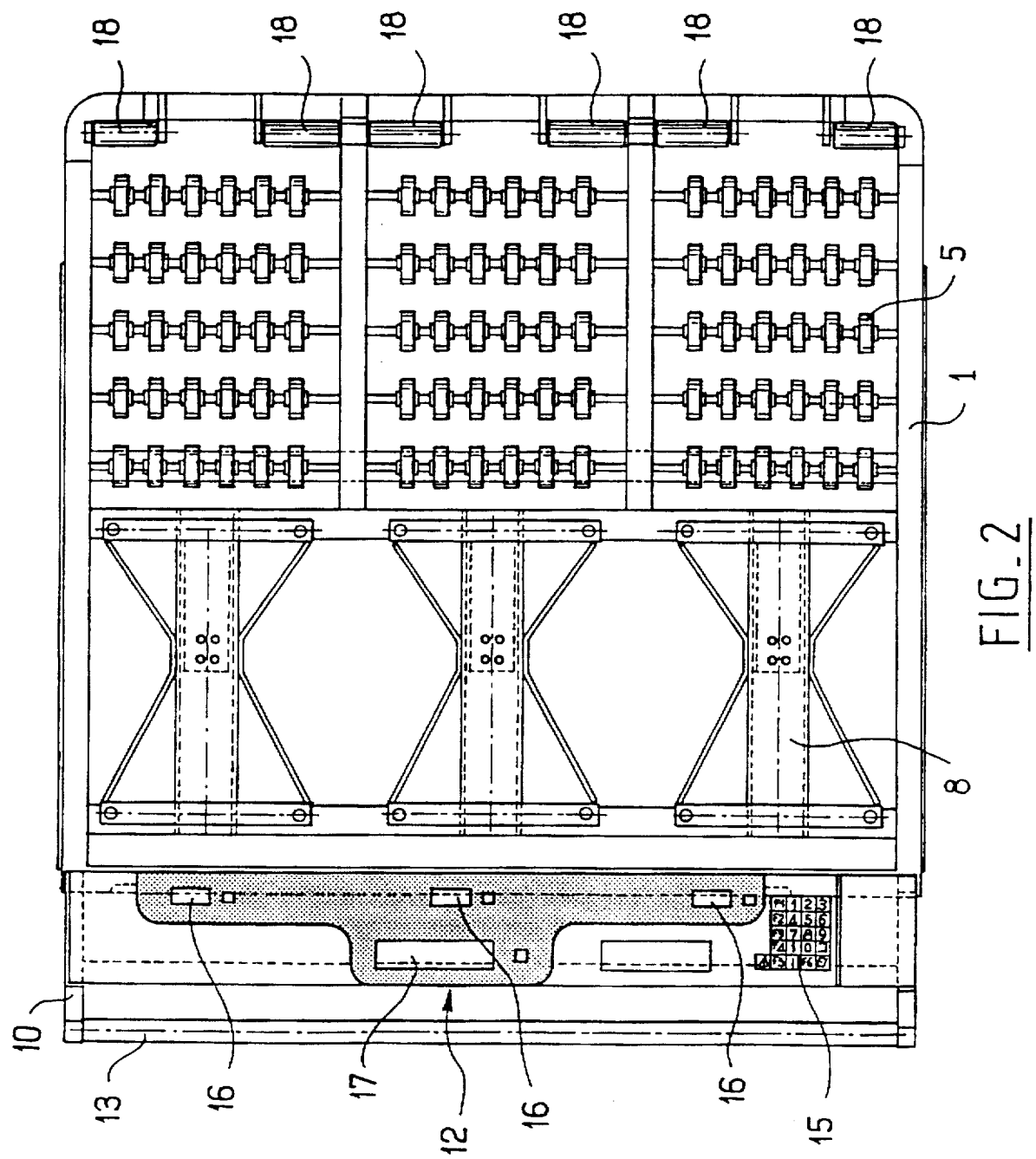
FIG. 2 is a top view of FIG. 1.

In FIG. 2, the small-diameter rollers 6 located above pans 7 are not shown for reasons of clarity.

At the rear of body 1, an arm 10 supports a radio transceiver 11 and a display device 12, as well as a handle 13 by which the cart can be maneuvered.

An electrical battery 14 is accommodated in the lower part of the cart to power the various electronic components thereof.

Display device 12, visible in the top view of FIG. 2, has a keyboard 15 allowing the operator to identify himself at the start of the picking trip. Three display areas 16 are provided opposite the location of each cart 4 to indicate to the operator, during picking, the destination carton of the articles to be picked.

A central display unit 17, larger than the previous display units, displays the messages to the operator to inform him of the pick location and number of articles to be picked, and give him additional instructions or report picking errors to him.

Using keyboard 15, the operator can enter data, for example, to record picking operations not carried out because the articles were out of stock.

With such a cart, an operator can simultaneously prepare up to three orders, which are respectively associated with three cartons located on the three pans 7 of the weighing elements. The cart is designed to accommodate up to six cartons.

FIG. 1 shows that these pans 7 are slightly tilted rearward in order to immobilize the cartons resting on rollers 6 and prevent a carton 4 placed on one of the pans from pressing against a neighboring carton, which could falsify the weighing results.

During picking, the display device indicates to the operator which articles are to be picked and their locations in the warehouse. The operator then brings the cart into the vicinity of the storage locations of the articles concerned and picks them up according to the information on the display device.

When one of the cartons of an order, located on the plan 7, is full, the operator grasps the still-empty cart 4 located at the front of the cart and moves the full carton by rolling it over rollers 6 and 5 to the front of the cart, against stops 18.

He then deposits the empty carton on pan 7 of the weighing device and begins to fill this empty carton.

When the orders are ready, the operator unloads the cartons at an appropriate point and can thus begin to prepare new orders.

Figure 3:
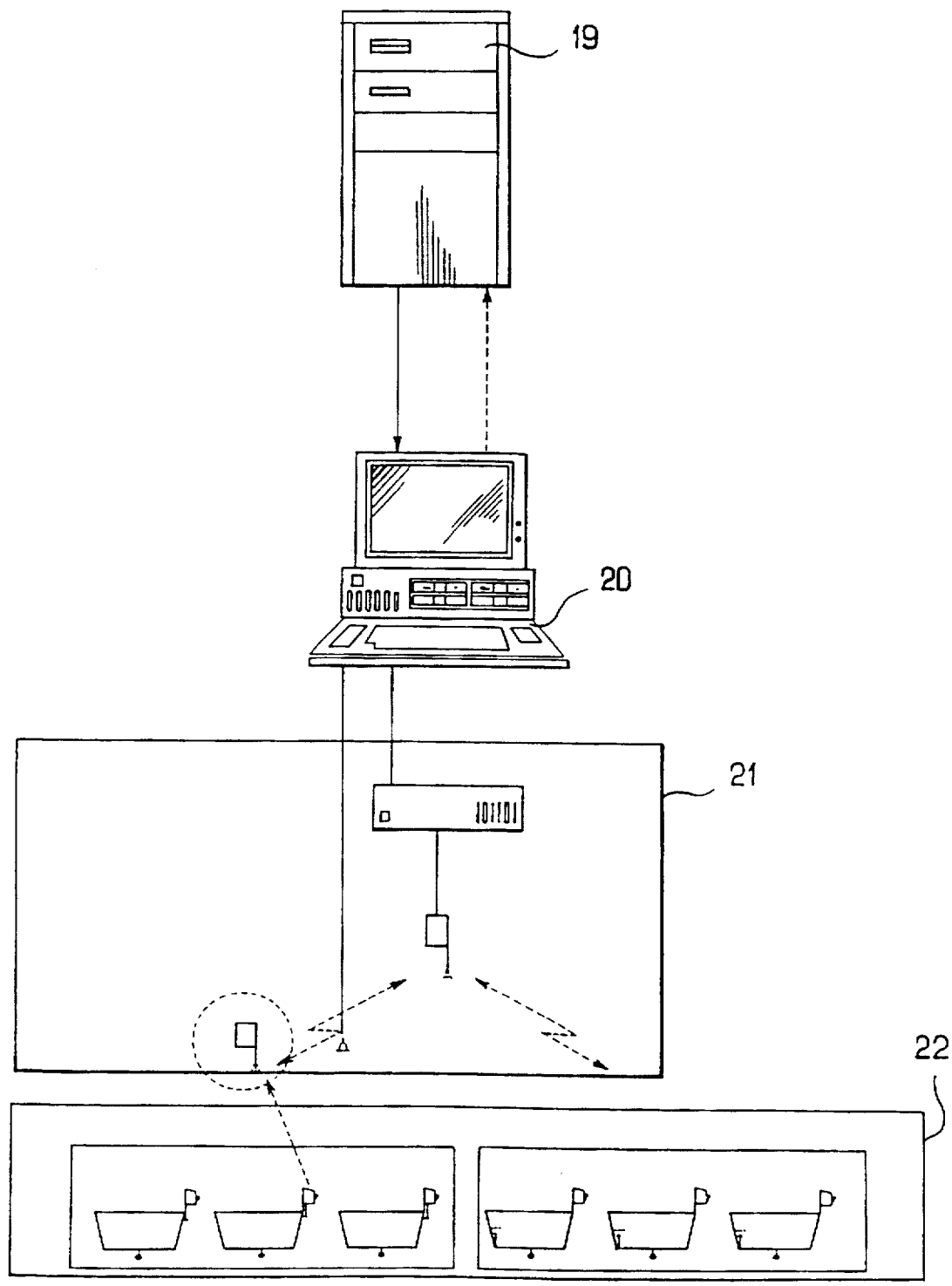
FIG. 3 is a diagram of a system for working the invention.

In the diagram of FIG. 3, all the elements in the preparation system according to the invention are shown.

This system is composed of a central computer 19 which stores the list of products in stock, their unit weights, their locations in the warehouse, and the orders to be prepared.

A processing station 20, which can be a microcomputer or a passive terminal of the central computer, receives the orders to be prepared from the latter.

This processing station 20 prepares, for each cart, a list of articles to be picked by merging up to three orders supplied by the central computer.

This list is sorted by article according to the locations of the articles in the warehouse and, for each article, bears the identification of the article in question, the number to be picked, the carton number to which it is destined, and the theoretical weight of this article in view of its unit weight and the number to be picked.

The lists are marked with a cart number and are transmitted by a radio transceiver 21 to the various carts 22.

Each cart 22 identifies the list intended for it and records it.

At the end of the picking trip, each cart 22 reports the proper completion of operations and any anomalies encountered to the processing station via radio transceiver 21.

Figure 4:
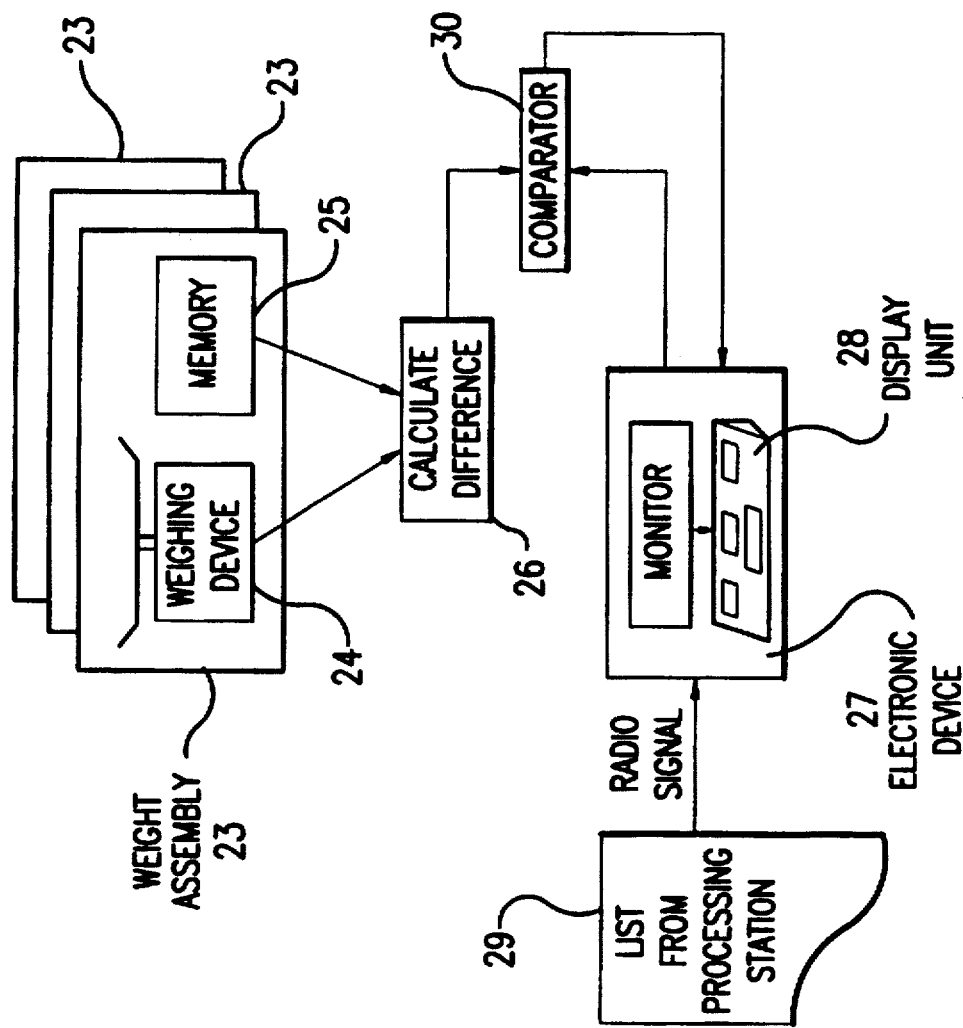
FIG. 4 is a block diagram of the various functional characteristics of a cart according to the invention.

FIG. 4 is a schematic diagram of the various functional characteristics of a cart 22.

Numeral 23 represents an assembly comprised of a weighing device 24 and its memory 25 which can record a value indicated by this weighing device at a given point in time.

Means 26 are provided to calculate the difference between a value indicated by a weighing device 24 and the value recorded in the corresponding memory 25.

An electronic device 27 provided with a display unit 28 is able to record a list 29 furnished by processing station 20 via a radio signal.

A comparator 30 receives the value of a difference calculated by means 26 and a theoretical weight furnished by electronic device 27. The result of this comparison made by comparator 30 is sent back to electronic device 27 for displaying a warning signal in the event an error is detected.

It is understood that the embodiments that have just been described are not limiting in nature and can receive any desirable modifications without thereby departing from the framework of the invention.

What is claimed is:

1. An order preparation method comprising assembling, in a receptacle placed on an autonomous cart, articles listed in an order from a customer and stored in a warehouse, comprising the following steps:
 a) from the order, creating a list of articles to be picked indicating an identification of each article and quantity thereof,
 b) arranging the articles in the list according to their location in the warehouse, starting with the first article on the list so arranged,
 c) moving the cart in the warehouse to a point near the storage location of the article to be picked,
 d) picking the proper quantity of the articles,
 e) depositing the article or articles picked in the receptacle, and
 f) iterating, starting from step c), for the next article in order in the arranged list, until the list is complete,
 each stored article having a given weight associated with the identification and, between steps e) and f), conducting a process comprising weighing the receptacle, deducing the total weight of the articles deposited in step e), comparing this total weight with a theoretical weight equal to the unit weight of the article to be picked multiplied by the quantity of articles, and delivering a warning signal if the total weight of the articles deposited is different, plus or minus a tolerance value, from the theoretical weight.

2. A method according to claim 1, wherein a different receptacle is associated with each order, multiple receptacles are located on the autonomous cart, in step a) all the orders are merged to produce a list of articles indicating the identification, quantity, and destination receptacle of each article and, in step e) above, the article or articles picked is or are deposited in the corresponding receptacle.

3. An autonomous picking cart for preparing an order comprising:
 a) a surface provided with receptacle-receiving areas, at least some of said areas comprising a pan of a weighing device,
 b) an electronic device provided with a display unit, able to record a list of articles in the order and sequentially display an identification, quantity, and destination receptacle of each article on the list,
 c) a memory associated with each weighing device for recording a first value indicated by the weighing device at a given point in time,
 d) means for calculating the difference between a second value indicated by each weighing device and the first value recorded in the corresponding memory,
 e) a comparator to compare the difference between the first and second values with a predetermined theoretical weight, and
 f) a warning device to emit a warning signal in the event the difference between the first and second values is different, plus or minus a tolerance error, from the predetermined theoretical value.

4. An order preparation system comprising:
 a) at least one autonomous picking cart for holding one or more receptacles to be loaded with articles comprising:
  (i) a surface provided with receptacle-receiving areas, at least some of said areas comprising a pan of a weighing device,
  (ii) an electronic device provided with a display unit, able to record a list of articles in an order and sequentially display an identification, quantity, and destination receptacle of each article on the list,
  (iii) a memory associated with each weighing device for recording a first value indicated by the weighing device at a given point in time,
  (iv) means for calculating the difference between a second value indicated by each weighing device and the first value recorded in the corresponding memory, (v) a comparator to compare the difference between the first and second values with a predetermined theoretical value, and (vi) a warning device to emit a warning signal in the event the difference between the first and second values is different, plus or minus a tolerance error, from the predetermined theoretical value; and b) a list preparation device comprising means for:

(i) creating a list of articles to be picked indicating an identification of the article, quantity of articles to be picked, and destination receptacle of each article of one or more orders, (ii) arranging the articles in the list according to the locations of the articles in the warehouse, and (iii) transmitting the list so prepared to the cart.

5. An order preparation system according to claim 4, wherein said system also comprises means for calculating theoretical weights for each article to be picked by multiplying the unit weight of the article by the quantity of articles to be picked and associating the theoretical weight with each article on the list of articles to be picked.

* * * * *